(12) United States Patent
Hsiao

(10) Patent No.: US 7,670,161 B2
(45) Date of Patent: Mar. 2, 2010

(54) ELECTRICAL CARD CONNECTOR

(75) Inventor: Hsueh-Lung Hsiao, Tu-cheng (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 12/156,024

(22) Filed: May 28, 2008

(65) Prior Publication Data

US 2008/0299806 A1    Dec. 4, 2008

(30) Foreign Application Priority Data

May 28, 2007   (TW) ................................. 96208664

(51) Int. Cl.
*H01R 13/62* (2006.01)
(52) U.S. Cl. ........................ 439/159; 439/188; 235/441
(58) Field of Classification Search ................ 439/159, 439/630, 188, 607; 200/51.09; 235/441
See application file for complete search history.

(56) References Cited

U.S. PATENT DOCUMENTS

| | | | |
|---|---|---|---|
| 6,482,029 B2 | 11/2002 | Nishimura | |
| 6,783,399 B2 * | 8/2004 | Joung | 439/630 |
| 6,821,155 B2 * | 11/2004 | Hsieh | 439/630 |
| 7,070,453 B1 * | 7/2006 | Chen | 439/630 |
| 7,147,515 B1 * | 12/2006 | Hung et al. | 439/630 |
| 7,326,071 B1 * | 2/2008 | Ho et al. | 439/159 |

* cited by examiner

*Primary Examiner*—Javaid Nasri
(74) *Attorney, Agent, or Firm*—Andrew C. Cheng; Wei Te Chung; Ming Chieh Chang

(57) ABSTRACT

An electrical card connector for receiving at least two electrical cards, comprises: an insulating housing; a shielding shell substantially enclosing the insulating housing; a front row of terminals and a rear row of terminals received in the insulating housing; an ejector receiving in one side of the insulating housing for ejecting two cards; wherein the front row of terminals are for connecting with one kind of electrical card and the front and the rear row of terminals together are for connecting with the other kind of electrical card.

1 Claim, 3 Drawing Sheets

ELECTRICAL CARD CONNECTOR

BACKGROUND OF THE INVENTION

1. Field of the Invention

The present invention generally relates to a connector, and particularly relates a connector to receive two kind of cards selectively.

2. Description of Prior Arts

With the tendency of reducing the size of a computer device and other digitally devices, demand has arisen for increasing its data storage capacity at low cost. Generally, electrical cards, such as SM (Smart Media) cards, CF Card, SD Card or Memory Stick Card, are data storage devices which are electrically connected to the computer device. The electrical cards are portable instruments that are easily inserted into and extracted from card connectors.

MMC Committee has proposed RS-MMC, MMC PLUS card. MMC PLUS card has especial shape that has 9 terminals in front row and 4 terminals in rear row. How to make an electrical connector with simple structure to receive a MMC PLUS card and the other card selectively is a different question to connector companies.

Hence, it is desirable to have a card connector with an improved terminal and housing structure to overcome the above-mentioned disadvantages.

SUMMARY OF THE INVENTION

It is an object of the present invention to provide a card connector with terminals for receiving two kind of cards selectively.

In order to achieve the above-mentioned object, an electrical card connector for receiving at least two electrical cards, comprises: an insulating housing; a shielding shell substantially enclosing the insulating housing; a front row of terminals and a rear row of terminals received in the insulating housing; an ejector receiving in one side of the insulating housing for ejecting two cards; wherein the front row of terminals are for connecting with one kind of electrical card and the front and the rear row of terminals together are for connecting with the other kind of electrical card.

Other objects, advantages and novel features of the invention will become more apparent from the following detailed description of the present embodiment when taken in conjunction with the accompanying drawings.

DETAILED DESCRIPTION OF THE PREFERRED EMBODIMENT

Figure 1:
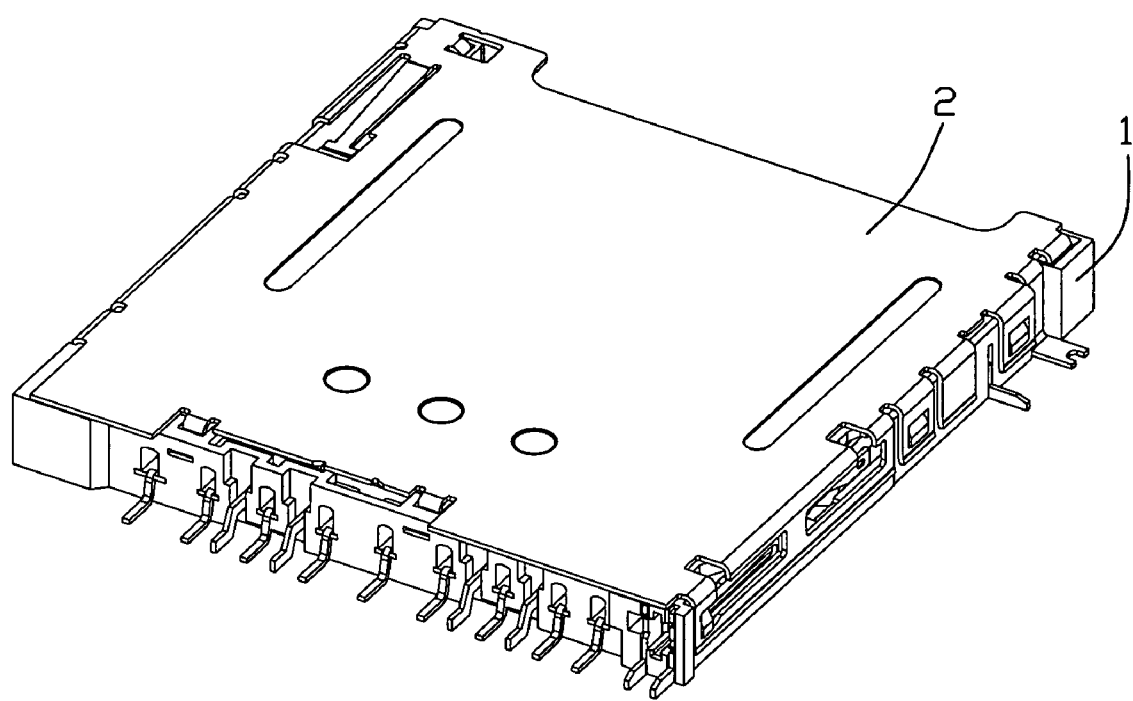
FIG. 1 is a perspective view of a card connector in accordance with the present invention.

Reference will now be made to the drawing figures to describe the present invention in detail.

Figure 2:
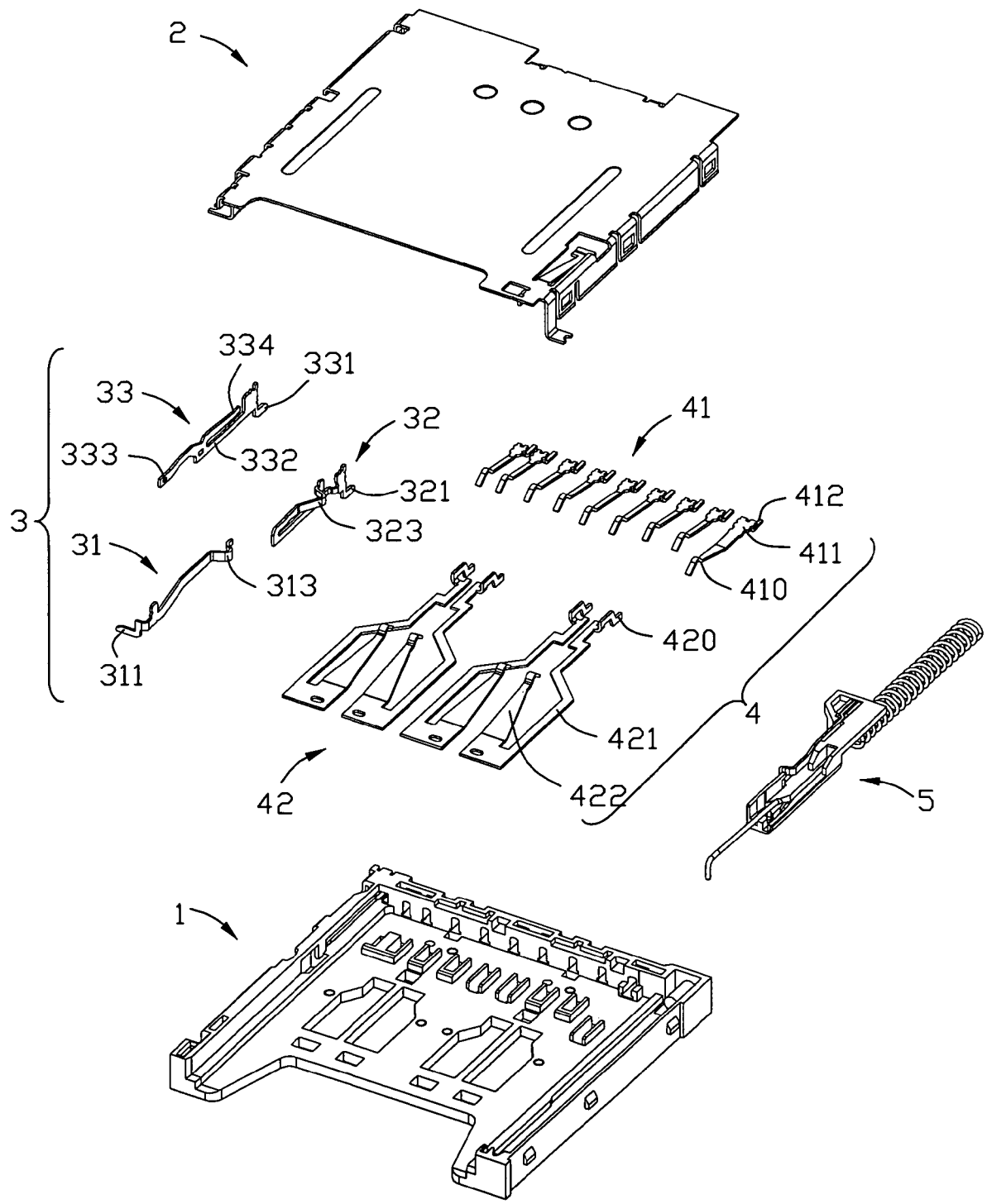
FIG. 2 is an exploded, perspective view of the card connector in accordance with the present invention.
Figure 3:
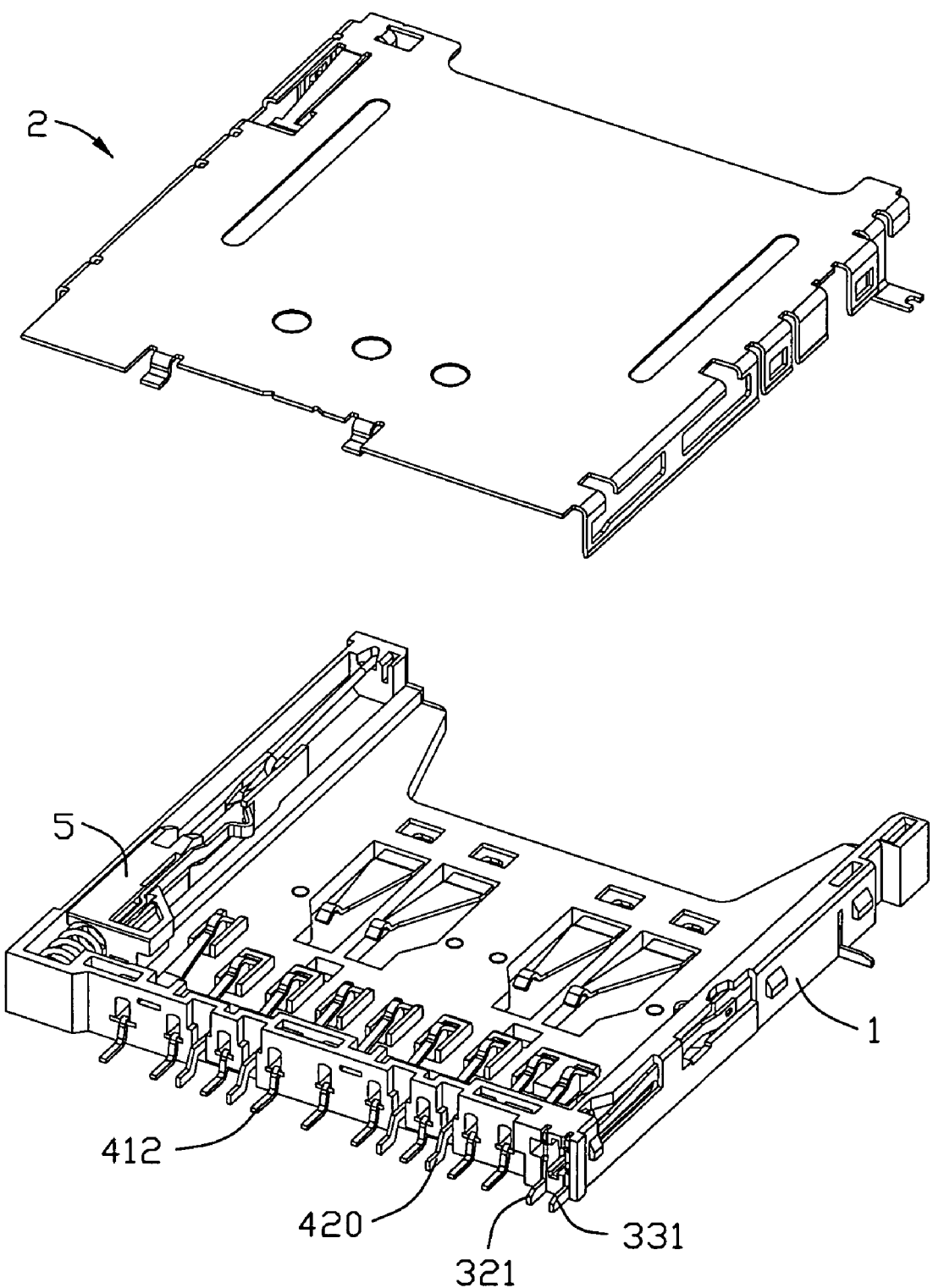
FIG. 3 is a partial assembled, perspective view of the card connector in accordance with the present invention.

With reference to FIGS. 1 to 3, a card connector 100 in accordance with the present invention for receiving two kind of electrical cards selectively, and comprises an insulating housing 1, a front row of terminals 41 and a rear row of terminals 42, switch terminals 31, 32 and 33 received in one side of the insulating housing 1, and an ejector 5 is received in the other side, a shielding shell 2 enclosing the housing 1 to form a card receiving space therebetween.

The front row of terminals 41 and the rear row of terminals 42 each have solder portions 412, 420 extending out of a front side of the housing 1, retaining portions 411, 421 receiving in the housing 1 and contact portions 410, 422 each extending into the card receiving space. The rear row of terminals 42 further has rear retaining portions receiving in the housing with contact portions 422 extending from the rear retaining portions frontwardly. Each solder portion 420 is formed in a plane vertical to that of the front row of the terminals 41. The front row of terminals 41 are formed to connect with one kind of electrical card and the front and the rear row of terminals together are for connecting with the other kind of electrical card.

Switch terminals comprise three terminals 31, 32 and 33 each has a solder portion 311, 321 and 331, one switch terminal 33 has an extending portion 332 and two contacting portions 333, 334 extending from two sides of the extending portion 332 and each contacting with a respective one of contacting portions 313, 323 of switch terminal 31, 32. Switch terminals 31, 32 and 33 are formed in a plane vertical to the front row of terminals 41.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

I claim:

1. An electrical card connector for receiving at least two electrical cards, comprising:

an insulating housing;

a shielding shell substantially enclosing the insulating housing;

a first row of terminals and a second row of terminals received in the insulating housing, the first row of terminals being configured and positioned for connecting with one kind of electrical card, the second row of terminals together with the first row of terminals being configured and positioned for connecting with the other kind of electrical card;

an ejector received in one side of the insulating housing for ejecting two cards; wherein each of the first row of terminals defines a thickness generally in an up-and-down direction and comprises a contact portion extending in a direction opposite to an insertion direction of the electrical card and a solder portion, each of said second row of terminals comprises a contact portion extending in the insertion direction of the electrical card and defining a thickness generally in the up-and-down direction and a solder portion defining a thickness in a left-to-right direction so as to occupy less space, and said solder portions of the first row of terminals and said solder portions of the second row of terminals are mixed up with each other in a line.

* * * * *